May 31, 1955 — W. D. SMITH — 2,709,608

SELF-SAFETYING TURNBUCKLE

Filed Aug. 12, 1952

INVENTOR:
WEBSTER D. SMITH

By Herbert E. Metcalf
HIS PATENT ATTORNEY

United States Patent Office 2,709,608
Patented May 31, 1955

2,709,608

SELF-SAFETYING TURNBUCKLE

Webster Deroyce Smith, Los Angeles, Calif., assignor to Northrop Aircraft, Inc., Hawthorne, Calif., a corporation of California Application August 12, 1952, Serial No. 303,934

3 Claims. (Cl. 287—62)

This invention relates to self-safetying turnbuckles and has for its general object the provision of a device of this kind which will be free from defects of those previously proposed, or in use.

The usual type of turnbuckle comprises a barrel interiorly threaded left handed at one end and right handed at the other end. Screw eyes similarly threaded engage in the ends of the barrel so that when the screw eyes are held against turning and the barrel is rotated the screw eyes are drawn into the barrel or moved outward in the barrel.

A general defect of turnbuckles in their ordinary use as tensioning means is that cables or rods attached to the screw eyes and under tension tend to slack back the screw eyes, particularly under conditions of extreme vibration and variation of temperature such as are encountered in aircraft, in which use it is particularly important to prevent such slacking back with consequent variation in the initial tension of the cables.

Various constructions have been proposed designed to prevent slacking back of the screw eyes of turnbuckles but none have come into general use because of drawbacks such as complexity of construction with consequent added cost, separable parts, with the accompanying liability of loss of a part, etc.

It is an object of my invention to provide a self-safetying turnbuckle having a minimum of parts and of simple construction with consequent low cost of production.

Another object of my invention is to provide a turnbuckle of the kind described comprising only a threaded barrel portion having at least one opening extending through the wall of an end portion, threaded securing means adapted to be screwed into said end and having at least one correspondingly arranged opening alignable with the opening in the end portion of the barrel, and sleeve means having at least one resilient detent adapted to removably engage in said opening of the threaded means.

Figure 7:
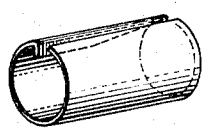
Figure 7 is a fragmentary detail view of another modified form of the invention.
Figure 1:
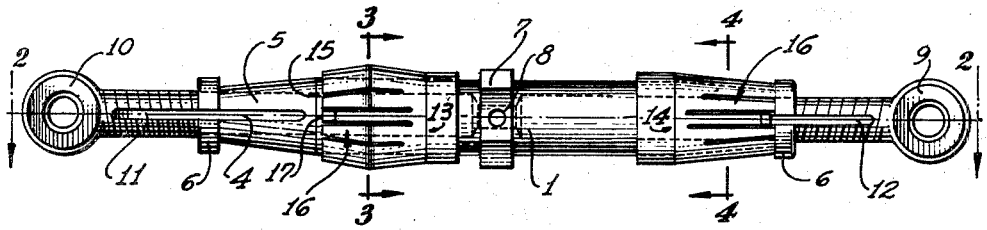
Figure 1 is a view of the turnbuckle of my invention in assembled condition, showing one sleeve moved into locking position, but the other sleeve not yet moved into that position.
Figure 2:
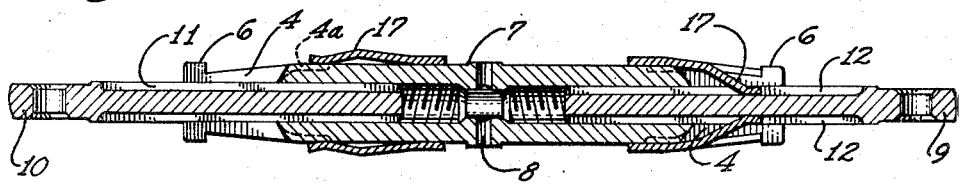
Figure 2 is a central longitudinal section through the turnbuckle shown in Figure 1.
Figure 3:
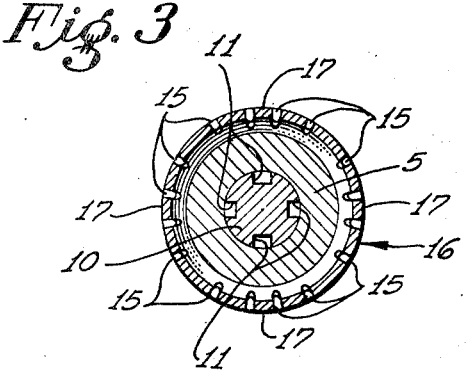
Figure 3 is a cross section on the line 3—3 in Figure 1.
Figure 4:
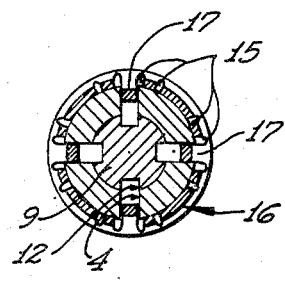
Figure 4 is a cross section on the line 4—4 in Figure 1.

In the drawings the numeral 1 indicates a barrel preferably but not necessarily of cylindrical shape. The barrel is interiorly threaded, as indicated at 2 and 3 with screw threads of opposite hand. Toward each end the walls of the barrel are provided with slots 4 therethrough; any suitable number of slots may be utilized as will later be explained.

The outside surface of the body is inwardly tapered, at the slotted portions as shown at 5, and a bead 6 of the full diameter of the body is provided at each end of the body. Slots 4 may or may not be carried through bead 6 as preferred.

A central hexagonal portion 7 may be formed on the barrel for manipulation of the turnbuckle by a wrench. The usual through-holes 8 enabling a tommy-bar to be used is shown as formed in the hexagonal portions 7.

Threaded securing means, shown as screw eyes 9 and 10, respectively threaded to engage in the right and left hand threads in the body are provided in the shanks thereof with longitudinal keyways or grooves 11 and 12 respectively alignable with at least one of the slots through the wall of the barrel portion. The grooves in the shanks of the screw eyes may be equal in number to the slots in the barrel or may be different in number, but in any case are substantially of equal width in both the barrel and screw eye shanks.

Locking sleeve members 13 and 14 are slidably mounted on the surface of the barrel; the sleeves being made of resilient material and preferably identical in construction.

The outer end of each sleeve is slotted, as indicated at 15, and bent inwardly to form spring fingers 16. At points corresponding to the spacing of slots 4 a tongue 17 is formed and bent downward to provide a resilient detent which when the sleeves are positioned toward the ends of the barrel will extend inwardly through the slots in the barrel and enter any grooves in the screw-eye shanks which may be aligned therewith thereby preventing relative rotation of the barrel and screw eyes.

The tongue or detent 17 may be readily released from the grooves in the screw eyes by moving the sleeves 13 and 14 back from the ends of the barrel thus causing the detents to ride out of the grooves 11 and 12.

While the sleeves may be readily pushed onto the barrel when assembling the turnbuckle, the sleeves will be prevented from being pushed off the barrel by the engagement of spring fingers 16 with beads 6.

When the sleeves 13 and 14 are in engaged position it will be noted that there is no projecting shoulder which might possibly be struck accidentally and move the sleeve into disengaged position. Preparably the tongue or detent 17 is held in alignment with the slots 4 by grooves 4a in the surface of the barrel and aligned with the slots. The grooves 4a need not be longer than sufficient to securely maintain the detents in inoperative position. If sufficient axial distance is provided for further movement of the sleeve the detents may be raised out of grooves 4a thereby enabling the sleeves to be rotated on the barrel if required as it may happen that due to small inaccuracies in production a particular detent may not perfectly match a particular slot in the barrel but will pass freely through another.

Figure 5:
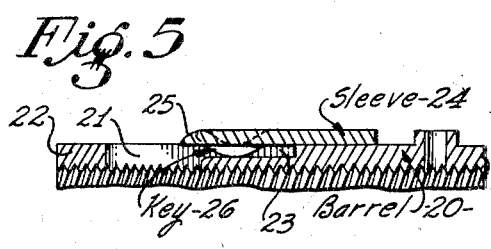
Figure 5 is a central longitudinal section through a modified form of the invention, the parts being in the position shown in Figure 1.

The modified form of turnbuckle embodying the features of my invention as shown in Figure 5 comprises a barrel 20 which is cylindrical throughout its length. Slots 21 are formed through the wall of the barrel, at each end thereof, leaving a solid ring 22 around each end of the barrel. Slots 21 are extended for a distance inwardly from the inner end of the slots as grooves 23 opening in the outer surface of the barrel.

Sleeves 24 of resilient metal are arranged to slide on the outer surface of the barrel. The outer edge 25 of the sleeves are rounded off as shown to reduce the danger of the edge being accidentally struck and the sleeve moved out of locking position.

Locking fingers or detents 26 are formed by slitting the outer ends of the sleeves at intervals. Detents 26 are bent inwardly and ride in grooves 23 in the disengaged position of the sleeves and are thus held in alignment with the slots 21 so that the detents will always project through the slots when the sleeves are moved outwardly and will engage against the solid ring 22 whether or not the screw-eyes are positioned in the barrel, this ensuring that the sleeves cannot become separated from the barrel, although they can readily be removed when required by the use of a scissors-like tool, inserted into the bore of the barrel after the screw eyes have been removed, to push the free ends of the detents outwardly so that they will ride over the solid ring 22 and enable the sleeve to be slid off the barrel.

It is obvious that the number of detents carried by the sleeves and of the slots and grooves in the barrel and shanks of the screw eyes may be arranged in various ways.

Figure 6:
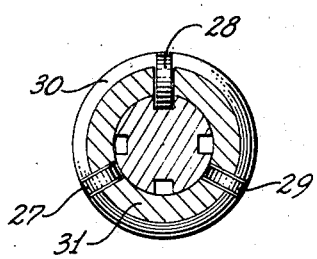
Figure 6 is a cross section illustrating a refinement which may be utilized in either form of the invention in the spacing of the slots in the barrel portion and in the securing means or screw eyes.

In Figure 6 three detents 27, 28, 29 carried by sleeve 30 are shown together with 3 slots in the barrel 31, but four grooves are provided in the shank of the threaded members connected by the turnbuckle. Obviously four detents and slots in the barrel and three grooves in the shanks would operate similarly. The effect of the arrangement shown is to enable alignment of one detent with a groove in the shank to be secured by each one twelfth revolution of the barrel 30. The described arrangement could be used to provide very accurate adjustment, for instance in the length of a control rod. It is to be noted that the sleeve member of the turnbuckle assembly may be formed in various ways to perform its function. For instance the sleeve 32 might be formed as shown in Figure 7 by rolling it from sheet metal with a cam shaped inwardly projecting detent 33 along one edge and then bringing the rolled sleeve to a spring temper. A sleeve formed as described could be used with a cylindrical barrel having an end bead or lip thus conforming to present standards which require a perfectly flush body at the ends of turnbuckle. It will be obvious that a pair of detents at 180° to each other may be provided by forming two semicircular sleeves each having an inwardly turned cam shaped detent extending along an edge, the facing detents of each half sleeve combining to form each of the oppositely arranged detents.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A turnbuckle comprising: an internally threaded barrel having the wall of at least one end portion thereof, provided with at least one slot therethrough; a threaded member screwed into said end of the barrel and having at least one longitudinal groove in the surface thereof alignable with the slot in said barrel end portion; sleeve means longitudinally slidable on the surface of said barrel and restricted in operation to engagement with the threaded member screwed into said end of the barrel; and resilient detent means carried by said sleeve means and projecting through the slot in said end portion of the barrel and engaging in the aligned groove in said threaded member when the sleeve is slid toward the said end of the barrel to prevent relative rotation of the barrel and threaded member at said end only, the detent being withdrawn from the groove when the sleeve is slid away from said end of the barrel, to permit relative rotation of the threaded member and barrel for axial adjustment of the threaded member in the barrel.

2. A turnbuckle comprising: an internally threaded barrel having the wall of at least one end portion thereof reduced in diameter progressively to a point adjacent its end; and provided with at least one slot through said portion; a bead portion between the end of the reduced diameter portion of the barrel and the end of the barrel; a threaded member screwed into the barrel and having at least one longitudinal groove in the surface thereof connecting with the slot in said barrel; a sleeve means longitudinally slidable on the surface of said barrel and restricted in operation to engagement with the threaded member screwed into said end of the barrel; inwardly bent resilient fingers at the end of said sleeve means adapted to engage against said bead to normally prevent the sleeve means from separating from said barrel and from being accidentally displaced from operative position; and resilient detent means carried by said sleeve means and projecting through the slot in said end portion of the barrel to engage in the aligned groove in the threaded member, when the sleeve is slid toward the end of the barrel, to prevent relative rotation of the barrel and threaded member at said end only and being withdrawn from the groove in the threaded member when the sleeve is slid away from said end of the barrel.

3. A turnbuckle comprising: an internally threaded barrel having the wall of at least one end portion provided with at least one slot and having a groove in the surface of the barrel aligned with and communicating at its forward end with the slot and extending for a distance inwardly and in alignment with said slot; a threaded member screwed into said end of the barrel and having at least one longitudinal groove in its surface alignable with the slot in said barrel; sleeve means longitudinally slidable on the surface of said barrel and restricted in operation to engagement with the threaded member screwed into said end of the barrel; and resilient detent means carried by said sleeve means and projecting through the slot in the barrel into the groove in the threaded member when the sleeve is slid toward said end of the barrel, said detent means being withdrawn from said slot when the sleeve is slid away from the end of the barrel but held against rotation thereon by the engagement of the detent means in the groove in the barrel, and freed from said groove when the sleeve is further slid away from said end of the barrel, to permit relative rotation of the threaded member and barrel for axial adjustment of the threaded member in the barrel.

References Cited in the file of this patent

UNITED STATES PATENTS

| 593,355 | Harris | Nov. 9, 1897 |
| 753,301 | Obiols | Nov. 7, 1903 |
| 770,374 | Laughon | Sept. 20, 1904 |
| 1,237,935 | May | Aug. 21, 1917 |
| 1,374,963 | Stevenson | Apr. 19, 1921 |
| 1,750,523 | Kaschtofsky | Mar. 11, 1930 |

FOREIGN PATENTS

| 311,269 | Germany | of 1919 |
| 415,460 | France | of 1910 |